United States Patent Office 2,754,187
Patented July 10, 1956

2,754,187

PRODUCTION OF SYNTHESIS GAS

George R. Bond, Jr., Paulsboro, N. J., and Alex G. Oblad, Springfield, Pa., assignors to Houdry Process Corporation, Wilmington, Del., a corporation of Delaware No Drawing. Application December 2, 1952,
Serial No. 323,718

8 Claims. (Cl. 48—196)

This invention relates to the preparation of gas mixtures comprising hydrogen and carbon monoxide suitable for use in the preparation of synthesized hydrocarbons. It is more particularly directed to the preparation of such gas mixtures from normally gaseous hydrocarbons and alkali metal-type carbonate.

The synthesis of hydrocarbons by reaction of carbon monoxide and hydrogen is a field in which considerable work has been done and appreciable progress has been made. As time and use result in the depletion of the natural sources of higher boiling hydrocarbons suitable for the preparation of fuels, propellants and the like, the preparation of synthetic hydrocarbons of similar and suitable boiling ranges and other characteristics becomes of increasing importance. Thus the preparation of suitable gas mixtures comprising carbon monoxide and hydrogen likewise becomes of increasing importance. Presently available from many sources are relatively large supplies of methane, and to somewhat lesser extent ethane and propane, which is of relatively refractory nature such that utilization thereof for purposes other than fuel have been in general relatively expensive and not too successful.

We have now found that methane and other normally gaseous hydrocarbons with the appropriate use of oxygen can in the presence of suitable contact agents comprising the carbonates of alkali metals and alkaline earth metals be reacted to form good yields of synthesis gas comprising hydrogen and carbon monoxide. By the terms "alkali metals" and "alkaline earth metals" as herein employed it is intended to include all of the metals of groups Ia and IIa respectively of the periodic table.

In accordance with our invention, normally gaseous hydrocarbons are contacted with alkali metal carbonates and/or alkaline earth carbonates at temperatures in the range of 1400–2000° F. to produce high yields of synthesis gas.

In the operation of this invention suitable carbonates when contacted with normally gaseous hydrocarbons are converted to the corresponding oxides in an endothermic reaction of the type indicated below $$M_xCO_3 + CH_4 \rightarrow M_xO + 2CO + 2H_2$$

wherein M represents alkali metal or alkaline earth metal and wherein $CH_4$ may be the total hydrocarbon charge or may be supplemented with up to 100% of other normally gaseous hydrocarbons.

In addition to the type of operation set forth immediately above it is possible to vary the hydrogen and carbon monoxide ratios by introducing to the reactor small and controlled amounts of steam. For example, a reaction of the following nature results in a different hydrogen to carbon monoxide ratio than the reaction set forth above.

$$Na_2CO_3 + 2CH_4 + H_2O \rightarrow Na_2O + 3CO + 5H_2$$

By changing the steam-hydrocarbon ratio of the charge gas, the hydrogen to carbon monoxide ratios in the product can be regulated to an appreciable extent. This is of definite advantage in synthesis operations wherein the requirements of the charge stock include specific hydrogen to carbon monoxide ratios which can be met as described above.

In its simplest form a continuous reaction system is readily operated in a manner similar to that described below. The reaction vessel is charged with the suitable carbonate such as for example a 50–50 mixture of sodium and potassium carbonates which is heated by suitable means to a temperature in the order of 1400–2000° F. wherein it exists in a molten condition. A suitable charge gas consisting mostly of methane (methane+steam) is preheated to approximately reaction temperature and is passed through the molten carbonate where, by the reaction of one or more of the types described above, there is produced an off-gas comprising predominantly carbon monoxide and hydrogen. The reaction results in the conversion of the alkali metal carbonate to the oxide form which is readily regenerated and reheated by submerged combustion of methane and oxygen whereby the alkali metal oxide is reverted to the carbonate and an off-gas product comprising mostly steam is obtained; thus, $$2M_2O + 2CH_4 + 5O_2(air) \rightarrow 2M_2CO_3 + 4H_2O$$

To provide a continuous system of operation, it is desirable to circulate the molten salt in two reaction zones; in one of which the synthesis gas preparation reaction is effected and in the other of which the heating of the molten salt to reaction temperature and the reconstitution of the carbonate is effected.

Typical examples of the reactions thus described are as follows.

*Example I*

Methane at a space rate of 0.625 volume of gas per volume of contact mass per minute was passed through a molten contact mass comprising a mixture of 1–1 sodium carbonate-potassium carbonate heated to 1600° F. and contained in a Monel metal reaction zone. The off-gas from this reaction contained 47.2% carbon monoxide, 41.7% hydrogen and 10.6% methane.

*Example II*

Methane contacted with a similar carbonate melt at 1700° F. in a cast iron reaction vessel gave an off-gas containing 26.6% carbon monoxide, 37.3% hydrogen and 35.3% methane. Some carbon was formed during this reaction.

*Example III*

In an operation similar to that of the preceding example except that the temperature was 1900° F., the gaseous product analyzed 29.9% carbon monoxide, 59.0% hydrogen and 10.2% methane. Some carbon was formed in this reaction.

*Example IV*

In an operation similar to that of Example I above except that the charge consisted of 2 parts of methane and 1 part of carbon dioxide and that the space rate was 1 volume of gas per volume of contact mass per minute, the following results were obtained.

| Temp., ° F. | Product Analysis, Percent by Volume | | | |
|---|---|---|---|---|
| | CO₂ | CO | H₂ | CH₄ |
| 1,600 | 15.4 | 23.1 | 8.6 | 50.0 |
| 1,700 | 10.6 | 38.7 | 14.3 | 36.1 |
| 1,800 | 5.5 | 50.0 | 25.4 | 17.4 |
| 1,900 | 3.0 | 44.6 | 32.4 | 18.5 |

Results obtained in the example immediately above indicate that the carbon to hydrogen ratio can likewise be varied by use of carbon dioxide, and that, in addition, greater or less amounts of carbon dioxide reversion can be obtained thus increasing the diversity and advantages in an operation of the type set forth in this invention.

Obviously many modifications and variations of the invention as hereinbefore set forth may be made without departing from the spirit and scope thereof and therefore only such limitations should be imposed as are indicated in the appended claims.

We claim:

1. A method for the continuous production of synthesis gas comprising contacting normally gaseous hydrocarbon charge with molten alkali metal carbonate at temperatures in the range of 1400–2000° F., separately recovering spent contact material containing alkali metal oxide, contacting said alkali metal oxide with normally gaseous hydrocarbon and oxygen at elevated temperatures, converting alkali metal oxide to alkali metal carbonate and returning alkali metal carbonate to contact with additional normally gaseous hydrocarbon.

2. The method for the production of synthesis gas comprising contacting normally gaseous hydrocarbon charge with contact material comprising molten alkali metal carbonate at temperatures in the range of 1400–2000° F., separately recovering spent contact material containing alkali metal oxide, contacting said alkali metal oxide at submerged combustion conditions with normally gaseous hydrocarbon and oxygen thereby converting alkali metal oxide to alkali metal carbonate, and subjecting said last-mentioned alkali metal carbonate to contact with additional normally gaseous hydrocarbon charge.

3. The method for the production of synthesis gas comprising reacting a gaseous charge comprising normally gaseous hydrocarbons with molten contact material comprising at least one of the carbonates of the alkali and the alkaline earth metals at temperatures in the range of 1400–2000° F., obtaining by said reaction synthesis gas with simultaneous conversion of at least a portion of said carbonate to oxide, separately recovering spent contact material containing said oxide, regenerating said spent contact material by converting said oxide to carbonate, and subjecting regenerated contact material to reaction with additional gaseous charge.

4. The method in accordance with claim 3 wherein said charge gas consists of a major portion of normally gaseous hydrocarbons and a minor portion of steam.

5. The method in accordance with claim 3 wherein said charge gas comprises a major portion of normally gaseous hydrocarbons and a minor portion of carbon dioxide.

6. The method in accordance with claim 3 wherein said contact material comprises a mixture of molten potassium carbonate and sodium carbonate.

7. The method in accordance with claim 1 wherein said molten alkali metal carbonate comprises a mixture of potassium and sodium carbonates.

8. The method in accordance with claim 2 wherein said contact material comprises a mixture of potassium and sodium carbonates.

References Cited in the file of this patent

UNITED STATES PATENTS

| Number | Name | Date |
|---|---|---|
| 1,943,821 | Hanks et al. | Jan. 16, 1934 |
| 1,959,189 | Woodhouse | May 15, 1934 |
| 2,449,359 | Abrams et al. | Sept. 14, 1948 |
| 2,602,019 | Odell | July 1, 1952 |
| 2,639,223 | Shapleigh | May 19, 1953 |
| 2,678,264 | Corner | May 11, 1954 |
| 2,682,459 | Stanier | June 29, 1954 |